United States Patent Office 2,709,394
Patented May 31, 1955

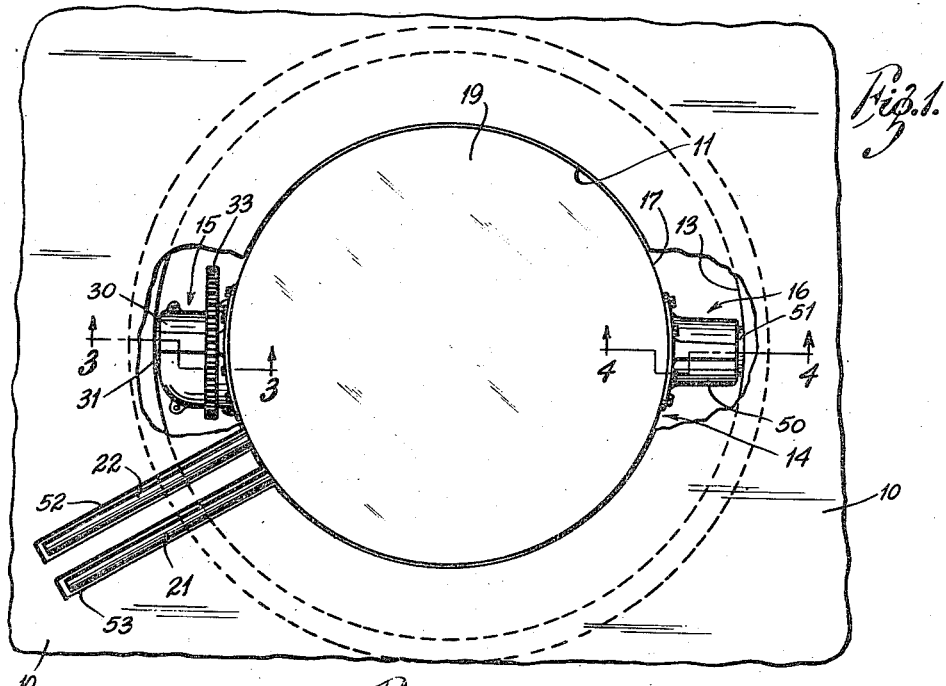
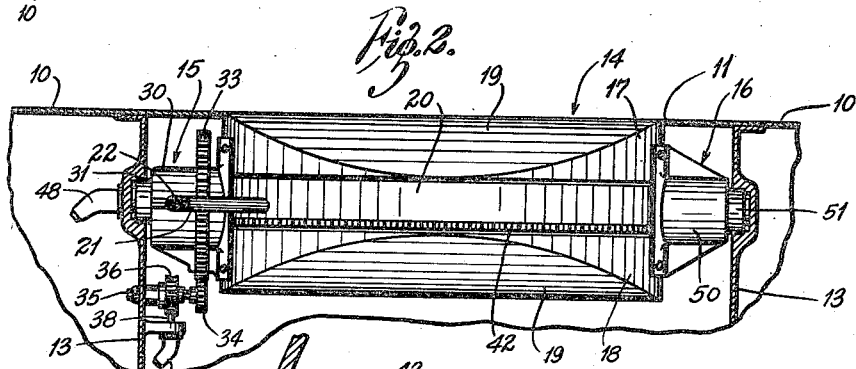
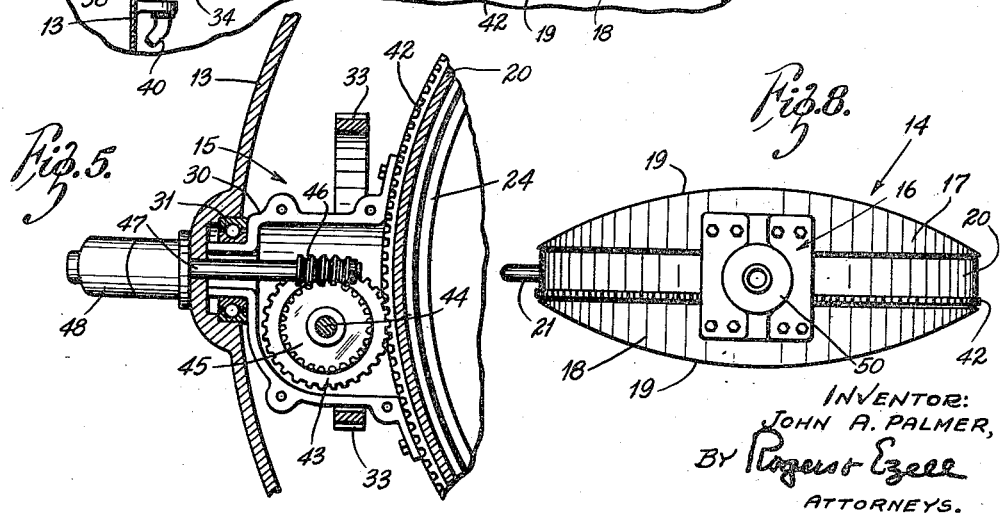

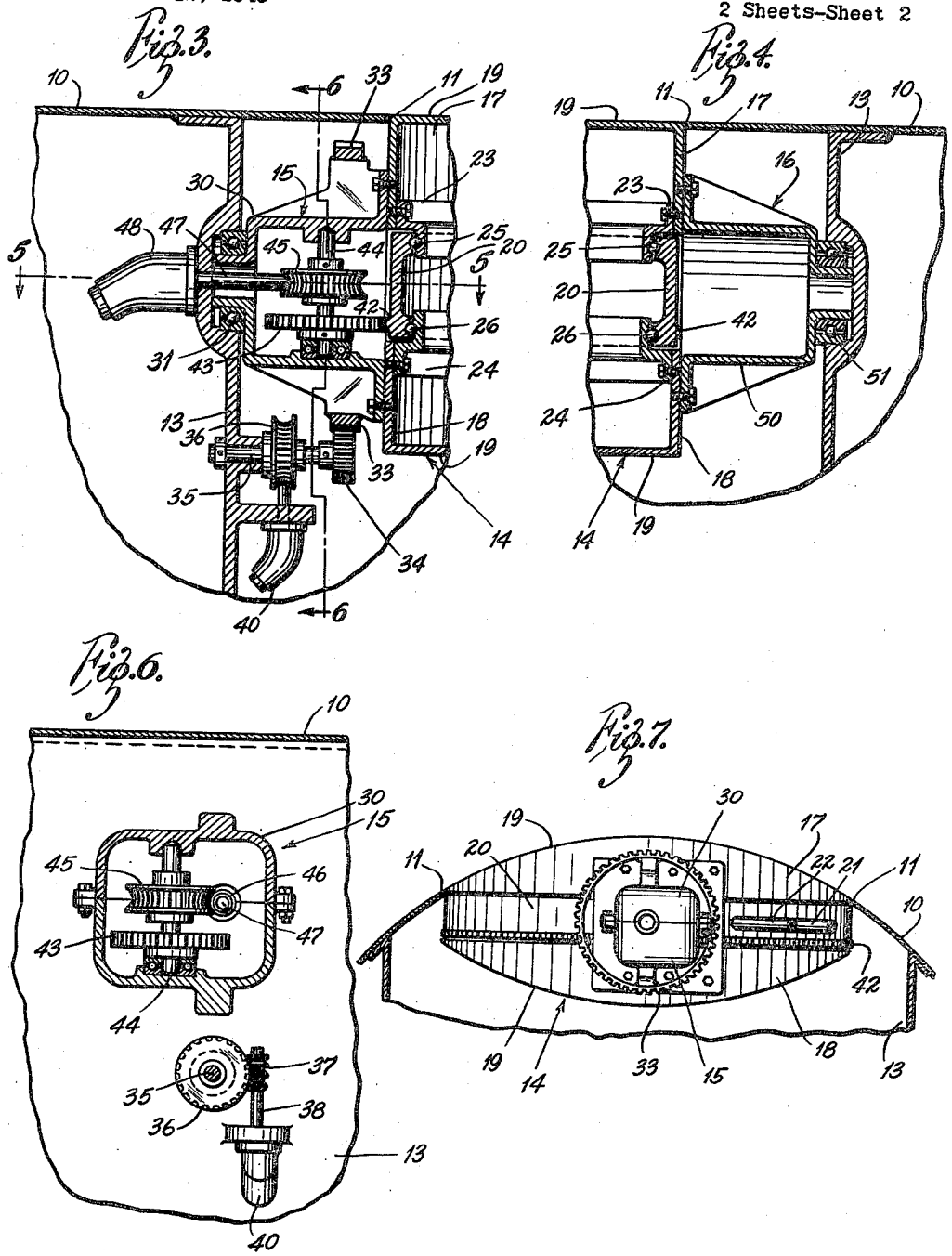

2,709,394

TURRET MECHANISM FOR AIRCRAFT

John A. Palmer, Normandy, Mo., assignor to The Emerson Electric Manufacturing Company, St. Louis, Mo., a corporation of Missouri Application January 12, 1949, Serial No. 70,520

2 Claims. (Cl. 89—37.5)

The present invention relates to a turret mechanism, and more particularly to a turret mechanism for use on aircraft.

It is an object of the invention to provide a turret mechanism that provides for adequate movement of a gun carriage about vertical and horizontal axes, and yet which is movable into position wherein it does not project from the body of the fuselage or other similar part in which it is mounted.

A further object of the invention is to provide for such a mechanism an arrangement by which there is a gun supporting portion that is tiltable about a horizontal axis, such as a fore and aft axis, and a further portion that is oscillatable about an axis normal to the horizontal axis, and wherein, when the gun support is tilted about its horizontal axis, it will continue to be streamlined with respect to air currents fore and aft of the airplane upon which it is mounted, so as to reduce the adverse effect of air currents upon the gun mounting as well as to reduce the drag occasioned by the tilting of the gun carriage.

Other objects will appear from the specification to follow, wherein:

Fig. 1 is a plan view of the turret apparatus;

Fig. 2 is an elevation of the turret itself with the associated parts of the craft shown in longitudinal section;

Fig. 3 is a vertical section on the line 3—3 of Fig. 1 showing typical driving means for the turret;

Fig. 4 is a vertical section on the line 4—4 of Fig. 1;

Fig. 5 is a horizontal section on the line 5—5 of Fig. 3;

Fig. 6 is a vertical section on the line 6—6 of Fig. 3;

Fig. 7 is a forward end view of the turret with the aircraft parts shown in section; and Fig. 8 is a rear view of the turret.

In the drawings, a portion of a fuselage is indicated at 10, the portion being designated by a part of the skin of the aircraft that is curved in a suitable manner, here shown as being the arc of a circle. There is a cut-out 11 of substantially circular projection removed from the skin 10 to receive the turret.

Beneath the skin 10, there is a cylindrical or the like sheet section or shell 13 that is secured beneath the skin 10 or to other suitable structural parts of the craft so as to provide a support means for the turret. The turret itself is generally designated at 14, and it is mounted in two bearings generally indicated at 15 and 16 that are arranged for providing rotation about a fore and aft axis, and are suitably mounted for such in the shell 13.

The turret 14 consists of upper and lower portions 17 and 18, respectively, that, as illustrated, are sections of a cylinder intersected by another cylinder, the axis of the two being at right angles to each other. This provides an outer surface 19 on each of the two outer elements that is curved to complement the curvature of the fuselage skin 10. It will be understood that, while the shape of the turret about its vertical axis should be circular to accommodate rotation about this axis, the shape of the section as appearing in Figs. 7 and 8 is convex so as to be complementary to the shape of the fuselage cross section.

The two sections 17 and 18 are supported in spaced relation by the bearings 15 and 16, which include bracket portions, as will appear. Between the two outer portions 17 and 18, there is an inner cylinder section 20 that actually is the gun support. The section 20 is shown as having two guns 21 and 22 mounted on it. Fig. 3 shows that the upper section 17 has a circular flange 23 extending around its inner surface toward its open edge. A similar bracket 24 is mounted around the open edge of the lower section 18. The upper member 23 constitutes a bearing race for bearings 25, and the lower section comprises a similar race for bearings 26, these two bearings, in turn, having their complementary races in suitable edges upon the middle section 20. These bearings 25 and 26 and their races provide for vertical support of the middle cylinder 20 and for its rotation about an axis at right angles to the fore and aft axis of the bearings 15 and 16. This arrangement permits the three turret sections 17, 18 and 20 to be made of sheet material to save weight.

The bearing 15, as already indicated, includes a bracket portion. This bracket portion here is shown in the form of a housing 30 that is suitably attached to the two outer portions 17 and 18, as indicated clearly in Fig. 3. The housing projects along the fore and aft axis of the craft and terminates in a bearing 31 that is secured to the shell 13 for proper support of the two elements 17 and 18 and the center member 20 at their forward ends for the rotation indicated.

A suitable means is provided for rocking of the housing 15, and hence of the three-part turret assembly, about the axis of the bearing 31. To this end, the housing supports a gear 33 that is engaged by a driving pinion gear 34 mounted on a shaft 35 that may be supported on the shell 13. This shaft has a worm gear 36 that is driven by a worm 37 that is operated from a suitable shaft 38 empowered from a source diagrammatically indicated as a hydraulic motor 40, remotely controlled. It will be seen that, when the worm 37 is operated, the gear 36 will be turned, as will the pinion gear 34, so that the gear 33 will rock the entire housing 30 and produce a rocking movement of the turret assembly 14 about the axis of the bearings 31.

In order to drive the center gun support disc or cylinder 20 about its own axis, an additional means is provided. The member 20 has a ring gear 42 formed about its periphery and engaged by a driving gear 43. The gear 43 is on a shaft 44 suitably supported for rotation in the housing 30. The shaft likewise has a worm gear 45 on it that meshes with a worm 46. The worm is on a shaft 47 that is concentric with the bearing 31. The shaft 47 is driven by a suitable source of power such as the remotely controlled hydraulic motor 48.

The other bearing, generally indicated at 16, may take a suitable form and is here shown as consisting of a bracket portion 50 that is attached to the inner and outer portions 17 and 18 of the turret. It then also provides support for a bearing 51 that is coaxial with the bearing 31.

Operation

Reference to Fig. 7 will show that, if the turret is tilted about the fore and aft axis, it will change the elevation of the guns 21 and 22. Preferably, the guns are arranged as shown in Fig. 1 so that they may be stowed away in slots 52 and 53 in the fuselage, when they are not in use. When so stowed they will not produce any drag on the aircraft. However, when the turret is rocked a predetermined distance about its fore and aft axis, the guns will be lifted from the slots 52 and 53. They may be brought to their proper elevation by operation of the motor 40 or other suitable drive that turns the driving gear 34 that meshes with the gear 33. This gear 33 is of sufficient diameter to give adequate change in elevation on either side of the craft. In other words, the turret may be rocked so that the guns point to the other side of the craft than that indicated in Fig. 1.

In order to secure the proper position in azimuth, the shaft 47 is driven so that it turns the gear 45 and the gear 43 that meshes with the gear 42 around the middle portion 20 of the turret, upon which portion the guns are actually mounted. When this rotation takes place, the guns may be moved through the full distance provided by the space between the opposite bearing brackets, which distance may be as large or small as is convenient to the circumstances. Ordinarily, the arrangement shown is satisfactory to prevent the guns from firing into the tail structure or forward structure of the craft itself.

Assuming that the azimuth position is not to be changed, but that the elevation is to be changed, the motor 40 will be driven to cause the turret to rock about the axis of the shaft 47 and of the bearings 31 and 51. When this occurs, the worm gear 45 merely rocks around the worm 46 because the latter is concentric with this axis of rotation. Suitable compensation in a remote control drive may easily be provided for accommodating any gun displacement that is caused by this operation. As an alternative, the motor 48 may be mounted on the housing 30 projecting through the bearing 31 and the support 13. No compensating mechanism would then be necessary. Flexible hose would be used between the fuselage and the motor.

When the guns are at rest, the turret is flush with the fuselage and has no added drag. When the turret is elevated to an angle, it presents a relatively thin wafer-like structure to the air stream. As the outer surfaces of the outer sections 17 and 18 are symmetrical about a plane transverse to the axis of the turret, the air stream finds substantially equal drag on both sides of the turret, which avoids irregular drag by the turret, to a maximum degree. When the turret is turned completely over with the guns on the opposite side of the craft from that indicated, the lower element 18 of the turret will assume a position corresponding to that of the upper element 17 when the guns are on the side shown. This affords equal drag conditions from the gun mounting parts, regardless of from which side firing is directed.

Thus it will be seen that this turret arrangement attains the objectives set forth of not projecting from the craft when the guns are stowed, and of affording minimum drag and minimum inequality of drag when the guns are in operation. The control is designed to be remote with the operator at a suitable position in the craft, with the controls coordinated with the driving mechanism for the turret.

What is claimed is:

1. In a fuselage and gun turret combination, the fuselage being convex in transverse section, and having a circular opening through the convex part, a turret mounted on the fuselage in the opening, the turret including a first circular shell portion inserted into the opening and having an outer surface convex to fit flush with the surface of the fuselage, and a second circular shell portion inwardly of the first portion with respect to the fuselage, means connecting the two portions together for rotation of the second section about its own axis, means supporting the two sections upon the fuselage for rocking movement of both together about an axis longitudinal of the fuselage and transverse to their axis, and a third shell portion inwardly of the second portion, that is symmetrical with the first portion, the supporting means including elements holding the first and third portions against rotation about their own axis, while the connecting means provides rotation as aforesaid of the second portion about its axis, all of the sections being of substantially the same diameter.

2. In a turret construction for use in a fuselage of an airplane; three superposed circular disc-like turret sections, consisting of outer and inner sections and a middle section between the outer and inner ones; means connecting the outer and inner sections together in spaced relation, means supporting the middle section in the space between the other two, including bearing means to provide rotation of the middle section relatively to the other two about their common axis; bearing means for supporting the outer and inner sections for rocking movement about a supporting axis transverse to said common axis; the middle section having a cylindrical edge surface and the two other sections having cylindrical edge surfaces with their outer and inner surfaces, respectively, curved substantially cylindrically about axes parallel to their supporting axis, all of said cylindrical edge surfaces being of substantially the same diameter, and gun barrel-sized openings through the cylindrical surface of the middle section.

References Cited in the file of this patent

UNITED STATES PATENTS

| | | |
|---|---|---|
| 2,336,557 | McCallister | Dec. 14, 1943 |
| 2,364,425 | Corte | Dec. 5, 1944 |
| 2,366,410 | Klemperer et al. | Jan. 2, 1945 |
| 2,377,073 | Eaton | May 29, 1945 |
| 2,454,806 | Kemmer et al. | Nov. 30, 1948 |
| 2,511,183 | Van Norman | June 13, 1950 |

FOREIGN PATENTS

| | | |
|---|---|---|
| 488,581 | France | July 6, 1918 |
| 776,317 | France | Oct. 31, 1934 |